(12) United States Patent
Pestotnik

(10) Patent No.: US 6,182,784 B1
(45) Date of Patent: Feb. 6, 2001

(54) ALL-TERRAIN VEHICLE, DRIVE TRAIN FOR SUCH A VEHICLE AND METHOD OF ITS OPERATION

(76) Inventor: Keith Edward Pestotnik, 32161 Fall River Rd., Trabuco Canyon, CA (US) 92679

(*) Notice: Under 35 U.S.C. 154(b), the term of this patent shall be extended for 0 days.

(21) Appl. No.: 08/955,695

(22) Filed: Oct. 22, 1997

(51) Int. Cl.⁷ ................................................ B60K 17/22
(52) U.S. Cl. ........................................... 180/376; 180/337
(58) Field of Search ..................... 180/337, 344, 180/364, 366, 374, 376, 248, 250

(56) References Cited

U.S. PATENT DOCUMENTS

| | | |
|---|---|---|
| 751,540 | 2/1904 | McLintock . |
| 799,148 | 9/1905 | Davis . |
| 845,983 | 3/1907 | Temple . |
| 967,164 | 8/1910 | Bleitz . |
| 1,058,921 | 4/1913 | Sweeney . |
| 1,241,609 | 10/1917 | Davis . |
| 1,291,542 | 1/1919 | Kawell . |
| 1,368,283 | 2/1921 | Olds . |
| 1,577,396 | 3/1926 | White . |
| 1,588,272 | 6/1926 | Scanlan . |
| 1,633,316 | 6/1927 | Davis . |
| 1,994,005 | 3/1935 | Plummer et al. . |
| 2,207,447 | 7/1940 | Viles et al. . |
| 3,448,818 | 6/1969 | Davis . |
| 3,480,156 | * 11/1969 | Pensa . |
| 3,499,339 | 3/1970 | Moore . |
| 3,553,886 | 1/1971 | Hamilton . |
| 3,570,316 | 3/1971 | Hornack et al. . |
| 4,856,367 | * 8/1989 | Nemoto ............................... 74/606 R |
| 5,496,226 | 3/1996 | Splittstoesser et al. . |
| 5,655,417 | * 8/1997 | Okada et al. ......................... 180/344 |
| 5,894,907 | * 4/1999 | Peter .................................... 180/374 |

* cited by examiner

*Primary Examiner*—Eric Culbreth

(57) ABSTRACT

A personal all-terrain vehicle (ATV) includes an engine of vertical shaft type, which has a power output shaft extending vertically above the engine. The engine power output shaft carries one pulley assembly of a belt-type continuously variable transmission (CVT), the second pulley assembly is carried by a vertically extending shaft supported in a bearing assembly secured to the engine. The vertically extending shaft carries shaft power vertically to a level below the engine at which a gear unit of T-configuration is disposed. The T-configuration gear unit provides for selection. of forward/reverse directions of travel for the vehicle, and also provides for splitting of shaft power between forward and rear differentials of the vehicle.

17 Claims, 3 Drawing Sheets

ALL-TERRAIN VEHICLE, DRIVE TRAIN FOR SUCH A VEHICLE AND METHOD OF ITS OPERATION

BACKGROUND OF THE INVENTION

1. Field of the Invention

The present invention is in the field of all-terrain vehicles, and more particularly relates to a personal all-terrain vehicle (ATV). Such vehicles are characterized as being of relatively small size and weight, and by being configured to carry one or two passengers who generally sit astride the vehicle in tandem, although some of these vehicles provide for the passenger(s) to sit partially within the vehicle. Such ATV's of the latter type generally have a bench style seat allowing the passenger and driver to sit side by side. Such vehicles are generally provided with four wheels having high-flotation tires, although some are provided with six or more such wheels and tires.

Further, such a vehicle may be configured also to carry a load, such as on a rack or on a load bed which is usually disposed at the rear of the vehicle. Some vehicles of this type have load racks both at the front and at the rear of the vehicle.

Additionally, such an ATV may have all-wheel-drive, or may have only an opposite pair of wheels which are driven. Vehicles of this type have become increasingly popular and are used for a wide range of purposes extending from recreation, to hunting, and to maintenance uses. Although some such ATV's may be amphibian, many are not. Although many such ATV's are not truly amphibian, they are intended to be able to and are used for making water crossings through a foot or so of water, as well as being able to negotiate deep mud.

Further to the above, the present invention relates to a drive train for such a vehicle and to a method of its operation.

2. Related Technology

Personal all-terrain vehicles (ATV's) of many different sizes, engine configurations, and engine types, as well as of differing drive train configurations, have been known for some time. Moreover, these conventional personal ATV's are generally recognized as including a single or multi-cylinder (usually a twin-cylinder) engine of horizontal shaft configuration, a multi-speed gear box transmission or a belt-type of continuously-variable transmission (CVT), and a power drive arrangement of one or more transfer cases and one or more differential cases providing power to an opposite pair or to all four wheels. Some ATV's also include a sub-transmission, allowing the operator to select from among two or more speed reduction (and traction power multiplication) ranges. The CVT's used in such ATV's is convention, and has received a high degree of development, starting generally with the use of such transmissions in snow mobiles.

Such CVT's generally include a first variable-diameter pulley assembly, which is engine driven, and is responsive to centrifugal force to act both as a clutch, and as a speed-responsive variable pulley. A belt is trained about this first pulley assembly, and extends to and around a second variable-diameter pulley assembly.

Generally, this second pulley assembly is torque responsive to cooperate with the first pulley assembly in establishing the effective speed and torque ratio between the driving pulley and the driven pulley.

A persistent problem with such ATV's which use a belt-type of CVT is that although the CVT is protected by a case, which is supposed to provide environmental and water protection to the drive belt and its variable pulleys, the severe use conditions to which many ATV's are subjected exceeds the protection provided to the CVT. Such is the situation particularly, when such conventional ATV's are subjected to use in making water crossings or are operated in deep mud. Such uses generally result in a great deal of moisture and water being around the CVT housing of the vehicle. In many cases some of the water or mud will find its way into the CVT transmission housing, and will get on the belt and/or pulleys of the CVT. Because such a CVT transmission depends for its proper operation upon the maintenance of a certain relatively high coefficient of friction between the rubber drive belt and the variable pulleys of the CVT transmission, when water or mud is introduced into such a transmission the power drive effectiveness of the vehicle may be largely lost.

Another consideration with conventional ATV's is that at higher speeds, the gyroscopic effect provided by the road wheels and tires contributes positively to vehicle stability. Conversely, when the vehicle is traveling at a relatively low ground speed, vehicle stability may not be as great as is desired. Even when the vehicle is traveling at a low ground speed, the engine and transmission components may be spinning at a high speed and will have a corresponding gyroscopic effect. That is, these engine and drive train components may have a significant gyroscopic effect which could contribute to vehicle stability. However, in conventional ATV's the gyroscopic effect of rotating components in the engine and drive train does not generally contribute positively to vehicle dynamics, or does not positively contribute to the full extent that would be possible. That is, a conventional ATV engine and transmission with horizontal shafts extending transversely to the vehicle can contribute a gyroscopic force which resists both roll and yaw, However, no effective gyroscopic effect is available to help stabilize the vehicle in pitch. Yet, because of their relatively short wheel base, stabilization of movements of a personal ATV in pitch is an important. aspect of vehicle stability and of driver and passenger comfort: on uneven terrain. Similarly, a conventional ATV with horizontal engine and transmission shafts extending longitudinally of the vehicle has gyroscopic forces which can assist vehicle stability in pitch and yaw, but not in roll. However, roll stability for such a vehicle is probably one of the most important stability considerations.

A conventional motor vehicle having all-wheel drive is disclosed in U.S. Pat. No. 751,540, issued Feb. 9, 1904 to D. L. McClintock (the '540 patent).

According to the '540 patent, a vehicle includes an engine with a horizontal shaft providing power into. a direction reversing gear box of T-configuration. As is seen in FIG. 10 of this patent, the T-configuration gear box may include a bevel gear power driven from the motor, and in constant mesh with an opposed pair of bevel gears. These opposed bevel gears are carried on a power output shaft, and are freely turning on this shaft. Each of the pair of opposed bevel gears defines a conical friction surface facing the like surface of the other of these pair of gears. Disposed between the pair of bevel gears is a double-sided friction cone, provided at its circumference with a groove into which a shift fork is received. This friction cone is drivingly but slidably related with the power output shaft. Accordingly, the output shaft may be power driven in each direction of rotation by selective engagement of the friction cone with a selected one of the opposed bevel gears by means of a shift lever connected to the shift fork.

Such T-configuration direction reversing gear units are known also which employ dog clutches rather than the conical friction clutch arrangements of the '540 patent. Such units are found, for example, in the lower drive units of outboard motors, in which they provide for selective forward and rearward driving of the boat propeller.

In view of the above, it would be desirable to provide an ATV having a drive train which is of increased resistance to being compromised by operation of the vehicle in water or deep mud. Similarly, it would be desirable to provide an ATV which utilized the gyroscopic forces available from spinning components in the engine and transmission system of the vehicle to improve vehicle stability and dynamics of movement at relatively low ground speeds.

SUMMARY OF THE INVENTION

In view of the above, it is a primary object for this invention to provide an ATV which avoids one or more of the shortcomings of the conventional related technology.

It is a further object for this invention to provide an ATV drive train and method of its operation which avoids one or more of the shortcomings of the conventional technology.

Further, it is an object for this invention to provide such an ATV which employs a CVT transmission, and provides increased resistance of the CVT from being contaminated or compromised in its operation by water, mud, and such environmental contaminants as may be encountered in the operation of such an ATV.

Still further, it is an object for this invention to provide an ATV, and ATV drive train and method of its operation, which employs such gyroscopic forces as may be available from spinning components in the vehicle engine and in the vehicle transmission to improve vehicle stability and motion dynamics, particularly at low ground speeds for the vehicle.

Accordingly, the present invention according to one aspect provides a personal all-terrain vehicle (ATV) with a chassis having plural road wheels upon which the chassis is supported for rolling travel upon a surface, the ATV comprising: an engine carried by the chassis and having a vertically-extending crankshaft with an external power output shaft portion extending vertically above the engine; a drive assembly having a driving first element drivingly carried on the power output shaft portion of the engine, and a driven second element carried on a driven shaft also extending vertically; the drive assembly including a power-transfer third element connecting engine power from the first element to the second element; and additional power train elements drivingly connecting with the driven shaft and transferring engine power to at least one of the plural road wheels to propel the ATV; whereby, the first, second, and third elements are disposed at an elevation above the engine in the ATV providing improved isolation from moisture when the ATV is operated in water or mud, for example.

According to another aspect, the present invention provides a method of providing motive power to a personal all-terrain vehicle (ATV) having a chassis supported on plural road wheels, the method comprising steps of: providing an engine on the chassis having a vertically-extending crankshaft with an external power output shaft portion extending vertically above the engine; providing a continuously variable transmission (CVT) having a driving first pulley assembly drivingly carried on the power output shaft portion of the engine, and a driven second pulley assembly carried on a driven shaft, arranging the driven shaft to also extend vertically; and the CVT further including a belt connecting engine power from the first pulley assembly to the second pulley assembly; and providing additional power train elements drivingly connecting with the driven shaft and transferring engine power to at least one of the plural road wheels to propel the ATV.

Still further, and according to another aspect, the present invention provides a modular power train assembly for a personal all-terrain vehicle (ATV), the modular power train assembly comprising: an engine having a vertically-extending crankshaft with an external power output shaft portion extending vertically above the engine; a continuously variable belt-drive transmission (CVT) disposed above the engine and having a driving pulley assembly drivingly carried on the power output shaft portion of the engine, a driven pulley assembly carried on a driven shaft also extending vertically, a support bearing assembly for the second shaft securing to the engine, and a flexible belt trained around the driving pulley assembly and around the driven pulley assembly and transferring engine power therebetween.

An advantage of the present invention derives from its utilization in an ATV of a vertical-shaft engine. While such engines are common, for example, in the field of riding lawn mowers, these conventional engine installations have an engine shaft extending below the engine. This conventional arrangement places drive belts, chains, and other components of the drive train, for example, at a low level in the vehicle. Such a location for drive train components that are sensitive to water and mud would not be suitable for use in ATV's for reasons explained above.

In the ATV of the present invention, the power output shaft of the engine extends vertically above the engine. The CVT of the present ATV is similarly mounted above the engine, and the. centrifugally-responsive pulley of the CVT is drivingly carried on the engine power output shaft. A flexible rubber belt is trained about this driving pulley, and extends to and around a driven pulley of the CVT. This driven pulley is generally torque-responsive, and drives a vertically extending shaft carried by a direction-reversing transmission gear unit (i.e., a forward-reverse gear transmission). Preferably, both the engine shaft and vertical shaft of the direction-reversing gear unit are disposed along the longitudinal centerline of the ATV. This disposition of comparatively heavy components assists in achieving a desirable balance of the vehicle, and also assists in mass-centralization. As is understood in the art, mass centralization assists in reducing the moment of inertia of a vehicle in one or more of pitch, roll, and yaw. Vehicles with reduced moments of inertia about selected axes are generally more nimble and more responsive to operator control inputs.

Further to the above, an environmentally-protective case surrounds the CVT, and provides for ventilation and cooling of the CVT by use of ducts extending to openings at relatively high locations on the vehicle so as to be resistant to entrance of water and mud. An engine-driven fan may be provided to move ventilating and cooling air through the CVT case. The transmission gear unit includes a lower portion receiving the lower extent of a vertically-extending driven shaft, and there driving a bevel gear (i.e., the drive bevel gear). This drive bevel gear is disposed between two opposed bevel gears (i.e., the driven bevel gears), and is in constant mesh with both. These opposed driven bevel gears are each carried on and are free spinning relative to a horizontal power output shaft. Mounted between the opposed bevel gears and keyed to the power output shaft is a clutching member, which may controllably slide along this shaft. The clutching member is slidable controllably along the horizontal shaft by use of a shifting fork. An externally accessible lever or handle provides for the vehicle operator to move the shifting fork. The clutching member is drivingly engageable alternatively with either one of the opposed bevel gears. When engaged with one of the opposed driven bevel gears, the power output shaft turns in a forward direction, and when engaged with the opposite one of the opposed driven bevel gears, the power output shaft turns in a reverse direction.

This power output shaft of the transmission gear unit has at least one external end portion protruding outwardly and carrying a coupling to which a drive shaft is connected. The drive shaft extends toward one end of the vehicle (i.e., either front or rear) to a gear drive or differential unit from which half-shafts extend laterally to respective drive wheels of the vehicle. A two-wheel drive vehicle may be arranged with either front or rear wheel drive. In the case of vehicles having four-wheel drive, the opposite end portion of the power output shaft also extends outwardly of the transmission gear unit, and connects with another coupling and another drive shaft extending toward the other end of the vehicle. This additional drive shaft connects with another gear drive or differential unit from which half-shafts extend laterally to the other drive wheels of the vehicle. The vehicle alternatively may include a selector drive unit which disconnects power transfer to one or the other of the axles, allowing the operator of the vehicle to select between use of two-wheel or four-wheel drive.

Additional objects and advantages of the present invention will appear from a reading of the following detailed description of a single exemplary preferred embodiment of the invention, taken in conjunction with the appended drawing Figures, in which like reference numerals indicate like features throughout the various views, or indicate features which are analogous in structure or function.

BRIEF DESCRIPTION OF THE DRAWING FIGURES

FIG. 1 provides a pictorial representation of a user driving an ATV embodying the present invention;

DETAILED DESCRIPTION OF AN EXEMPLARY PREFERRED EMBODIMENT OF THE INVENTION

Figure 1:
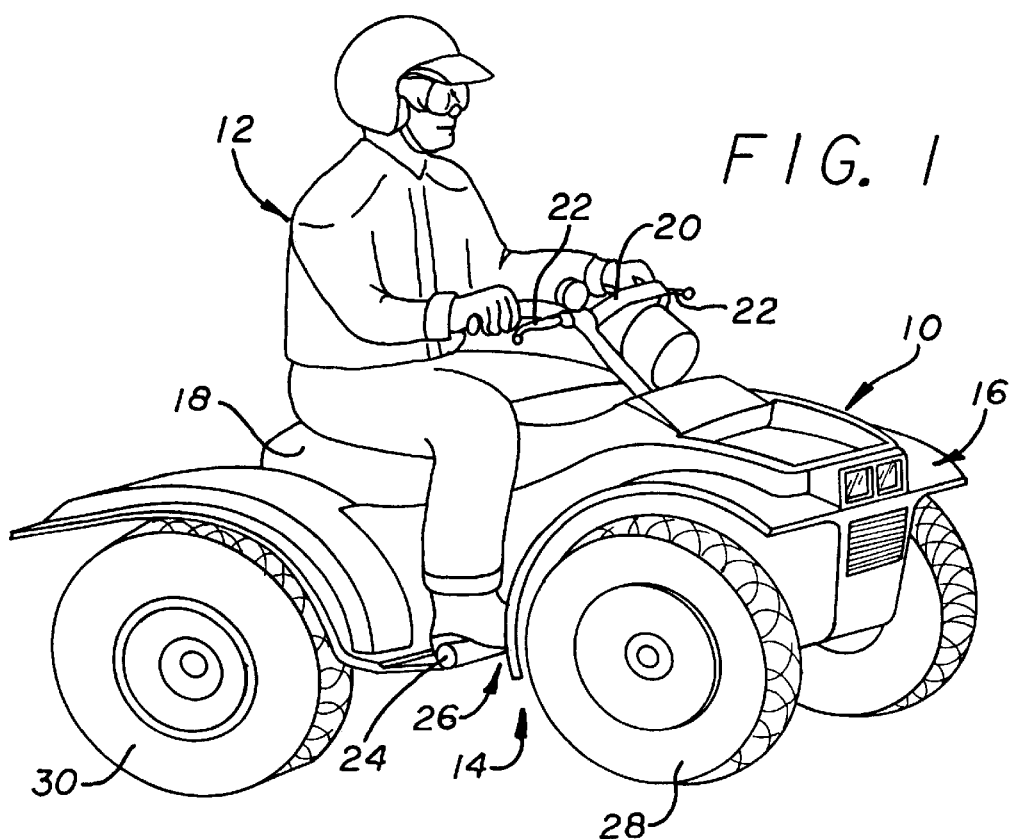

Viewing FIGS. 1–4 in conjunction with one another, and with attention first to FIG. 1, an all-terrain vehicle (ATV) 10 is seen in operation, while being driven by an operator 12. The ATV 10 is a four-wheeled vehicle, although it will be seen that the invention may be embodied in a three-wheeled vehicle (i.e., in an all-terrain cycle (ATC)), or in a vehicle having more than four wheels (i.e., in a 4×6, or 6×6 vehicle, for example). Generally, the ATV 10 has a chassis, generally indicated with the numeral 14, and which is formed, for example, of steel tubing and stampings assembled by fasteners and possibly also by use of welding techniques, such as SMAW, spot welding, or MIG welding, for example. The details of the chassis construction for an ATV are well known to those ordinarily skilled in the pertinent arts, and the present invention is not limited to any particular materials of construction or design for the chassis of the ATV 10.

The chassis 14 has various body panels, fenders, luggage racks, etc., attached (all generally indicated with the numeral 16). Also, the ATV 10 has a seat 18 upon which the operator sits astride of a central portion of the chassis 14, and a handle bar 20 with various manual controls 22, which along with foot rests 24 (or foot pegs as illustrated), and associated foot controls 26, allows the operator to control the vehicle 10 much like a motorcycle. The front wheels 28 (i.e., wheel and tire assemblies) of the ATV 10 are dirigible, and are steered by pivotal motions of the handle bar 20.

At least the rear wheels 30 (i.e., also wheel and tire assemblies) are powered by an engine 32 carried in the chassis 14, and the engine 32 may power the front wheels 28 as well to provide two-wheel, four-wheel, or all-wheel drive, as will be explained.

Figure 2:
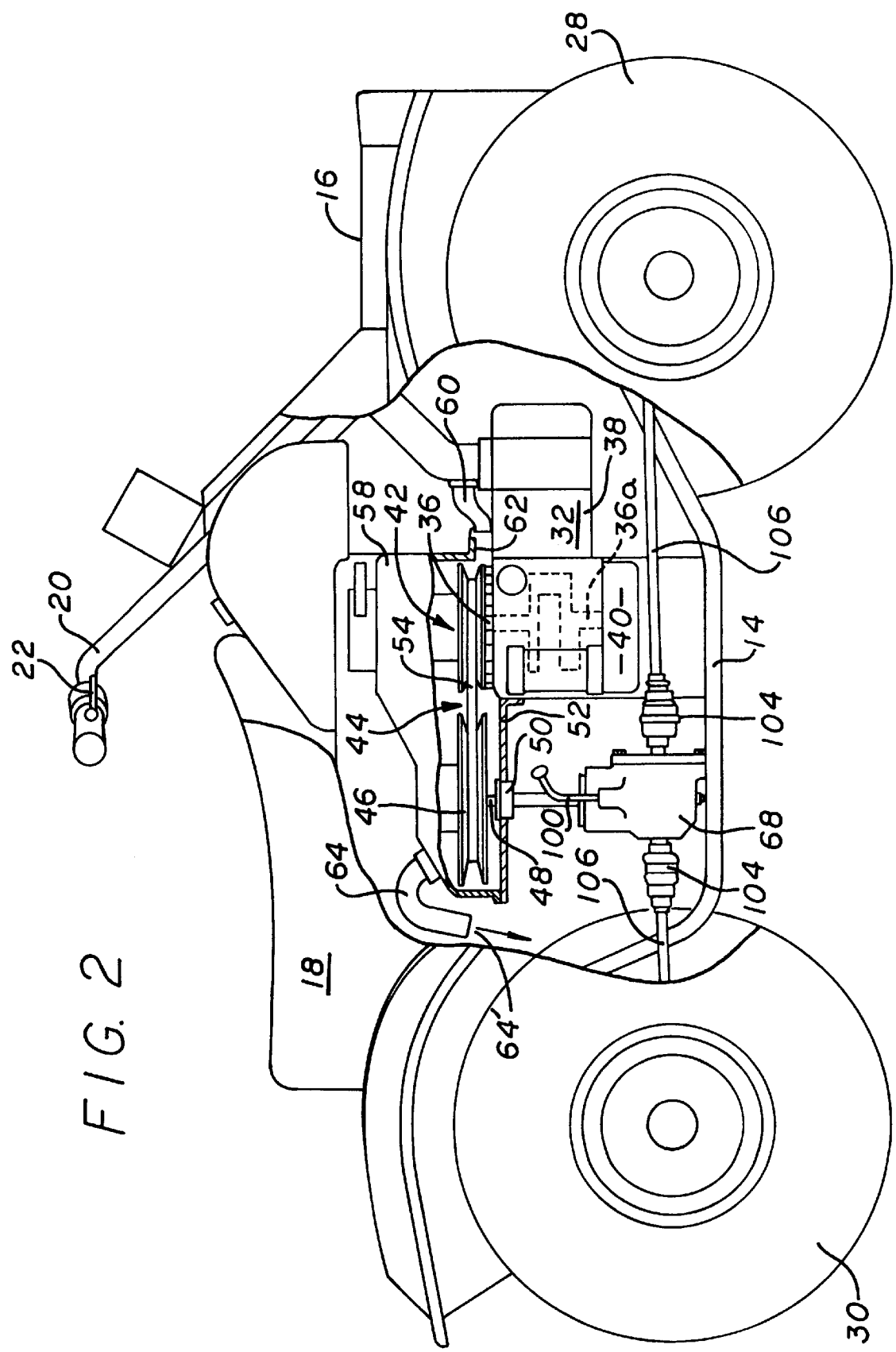
FIG. 2 is a diagrammatic side elevation view of the ATV seen in FIG. 1, with the vehicle shown partially in phantom lines to allow the layout of the engine and power train of the vehicle to be seen.
Figure 3:
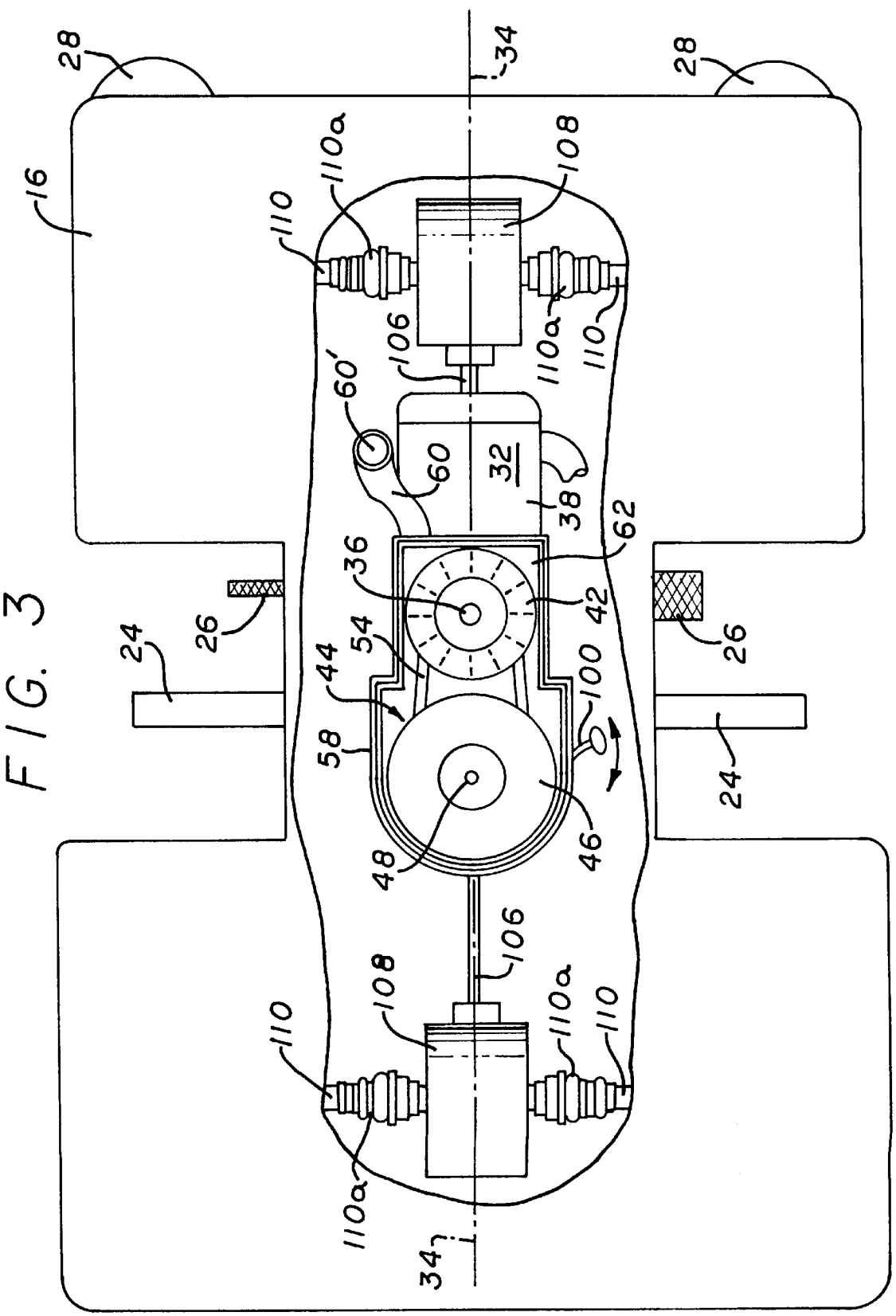
FIG. 3 is a plan view of the ATV seen in FIGS. 1 and 2, and is also shown partially in phantom lines to better illustrate the engine and power train layout of the vehicle.

Considering now FIGS. 2 and 3, it is seen that the chassis 14 has a longitudinal center line 34 (seen in FIG. 3) extending between the front and rear of the ATV 10. The engine 32 has a vertically extending crankshaft (indicated with dashed lines and the numeral 36a), an external power output shaft portion 36 of which is seen to extend vertically outwardly of and above the engine 32. The cylinder portion 38 of the engine 32 is in this case arranged to extend horizontally toward the front of the ATV, although the invention is not limited to this engine arrangement. An advantage of the horizontal cylinder engine arrangement shown, however, is a low center of gravity for the engine 32, thus contributing for an improved balance of the ATV 10.

Importantly, the crankshaft 36a does not extend outwardly of engine 32 in a downward direction, so that the engine can have a closed pan oil sump, indicated with the numeral 40.

Carried on the output shaft 36 is a driving pulley assembly 42 of a continuously-variable rubber belt type of transmission system (CVT), generally indicated with the numeral 44. This CVT 44 also includes a driven pulley assembly 46, which is carried on a vertically extending driven shaft 48. The driven shaft 48 also extends vertically, and is located rearwardly of the engine 32 along the longitudinal center line 34. The vertically extending driven shaft 48 is journaled near its upper end by a bearing 50 carried in a bearing support assembly 52 extending rearwardly from the engine 32. A rubber belt 54 is trained around the pulley assemblies 42 and 46, and drivingly connects these pulleys while providing a variable speed ratio (and torque ratio) between the engine shaft 36 and driven shaft 48.

Figure 4:
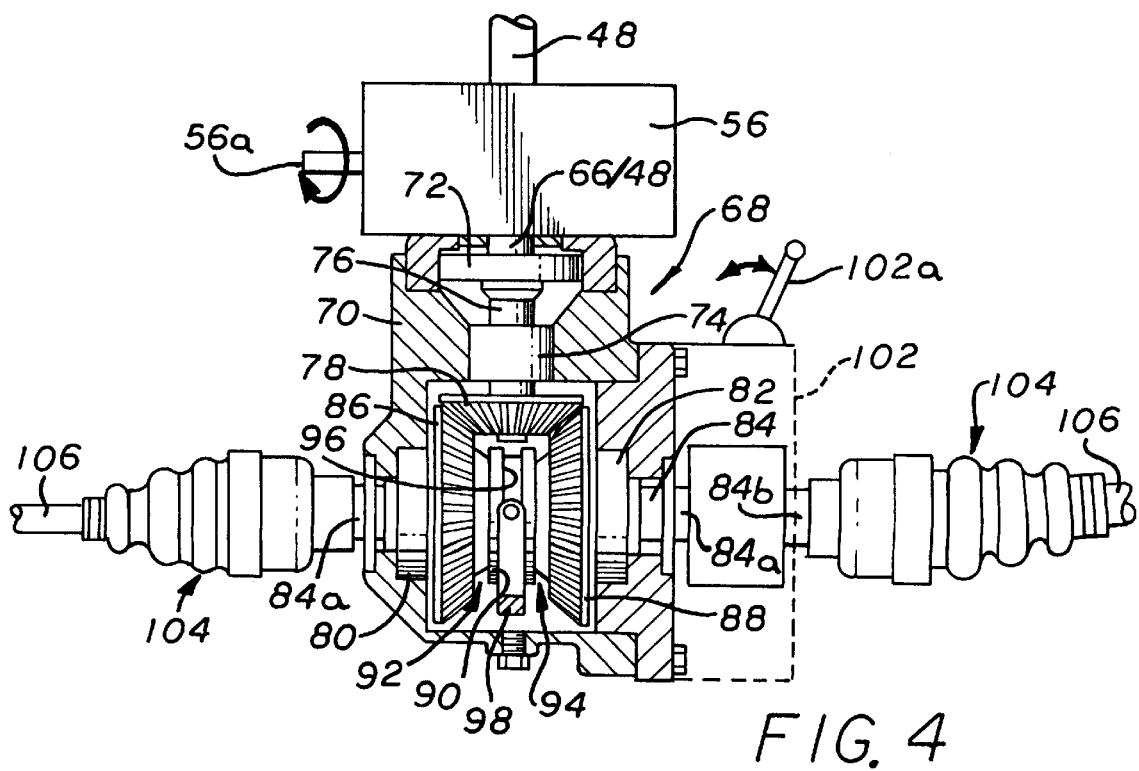
FIG. 4 provides a fragmentary cross sectional elevation view of a transmission gear unit of the ATV seen in the preceding drawing Figures.

Keeping FIGS. 1–3 in view, and viewing now particularly FIG. 4, it is seen that a lower extent of the shaft 48 may be journaled by a gear unit 56, which is mounted to the chassis 14. The gear unit 56 may be of alternative configurations, and may include one or the other or both of a multi-speed sub-transmission or a power take off (PTO) drive. The sub-transmission may provide, for example, for a normal, low, and ultra-low speeds for the ATV 10, with corresponding tractive power multiplication's. Alternatively, the gear unit 56 may provide for a power take off (PTO) shaft (depicted on FIG. 4 and indicated with the numeral 56a) to extend outwardly from the ATV 10 in order to run accessory devices from the engine 32. For such a use, the vehicle would be in neutral, and the engine power would be delivered to shaft 56a, and then externally of the vehicle to drive other devices. For example, the engine 32 of the ATV 10 may be used in this way to operate a fire fighting pump, which may be used by forest service personnel at remote locations to fight forest fires.

Another accessory device which might be operated by power from engine 32 via a PTO shaft output is an electrical generator. In this case, such an electrical generator might be used to operate electrical power tools, or to providing lighting in remote locations where line power is not available.

Further viewing FIG. 2 it is seen that the CVT 44 is enclosed within a protective casing, generally indicated with the numeral 58. For example, the casing 58 may include an intake-air filter for the engine 32.

An air intake duct 60 extends from the casing 58 to an opening 60' which is disposed at a comparatively high location on the ATV 10 in order to resist the ingestion of water and mud, for example, when the ATV is operated under conditions making such ingestion possible. In the event that the casing 58 also includes an intake-air filter for the engine 32, the duct 60 may also be used to deliver combustion air to the engine 32. The duct 60 extends to a fan casing 62, which is disposed in association with the driving pulley assembly 42 of the CVT 44. This driving pulley assembly is conventionally provided with radially extending fins, which operate as a form of centrifugal fan when the engine 32 is operating. Thus, ambient air is inducted into the CVT casing 58 when the engine 32 is operating in order to ventilate and cool the CVT 44. In order to allow the ventilation air to be vented from the casing 58, another duct 64 extends from the casing 58 to a downwardly disposed outlet 64'. As is depicted by the flow arrows at each of the inlet opening 60' and outlet opening 64', ambient air flow is provided through the casing 58.

Returning now to a further consideration of the drive train of the ATV 10, it is seen that the gear unit 56 provides a shaft 66 extending vertically downwardly to a direction reversing and direction changing drive unit 68. Alternatively, in vehicles which are not provided with the gear unit 56, the driven shaft 48 may connect directly to the drive unit 68. For this reason, it is seen in FIG. 4 that the shaft providing shaft power to the gear unit 68 may be either shaft 66, or the shaft 48 which is powered by pulley assembly 46. This drive unit 68 is generally of a T-shaped configuration, and includes a housing 70 carrying bearings 72 and 74. The bearings 72, 74 cooperatively carry a shaft portion 76 which is integral with (or drivingly coupled to) and carries a driving bevel gear 78. Similarly, the housing 70 carries a pair of bearings 80 and 82, each respectively carrying one of a pair of opposed driven bevel gears, each in constant mesh with the driving bevel gear 78. Each bevel gear 86, 88 carries a bearing (not seen in the drawing Figures) which is preferably a needle-type bearing, and which cooperatively journal a shaft 84. The housing 70 is provided with appropriate seals at the shaft 84, which may include one or two outwardly extending (and possibly exposed) end portions 84a, while lubricant is retained within the housing 70.

Because the bevel gears 86 and 88 are on opposite sides of the driving bevel gear 78 and are in constant mesh with this driving bevel gear, they rotate in opposite directions in response to rotation of the shaft 76 and driving bevel gear 78. As mentioned above, the gears 86 and 88 are freely rotatable on the shaft 84. In order to drivingly couple one or the other of these bevel gears to the shaft 84, a shift sleeve member 90 is slidably carried on the shaft 84, but is splined, keyed or otherwise drivingly associated with the shaft 84.

The shift sleeve member 90 at its opposite axial faces, and the confronting axial faces of the bevel gears 86, 88 each define respective parts of respective clutching mechanisms, generally indicated with the arrowed numerals 92 and 94.

One example of a clutching mechanism that is believed to be usable in the drive unit 68 at the locations 92 and 94 is a dog-type of clutch.

Alternatively, a cone-type of positive-drive clutch may be employed at locations 92 and 94. In each case, the clutching mechanisms 92 and 94 respectively disengage when sleeve 90 is moved axially away, and engage when the sleeve 90 is moved axially close to the respective bevel gear on shaft 84. In order to move the sleeve 90 along the shaft 84, this sleeve is provided with a circumferentially extending groove 96, and a shifting fork 98 is movable in the housing 70 and has a portion received in groove 96. The sleeve 90 has three possible axial positions along shaft 84, one in which bevel gear 86 alone is coupled to shaft 84, another in which bevel gear 88 alone is coupled to shaft 84, and a third position in which neither bevel gear 86 or 88 is coupled to the shaft 84 (i.e., a neutral position). An externally accessible lever 100 (best seen in FIG. 3) provides for the operator 12 to shift the sleeve 90 between its alternative positions.

FIG. 4 also illustrates that the housing 70 may be associated with an optional selector-unit housing 102, which internally includes a disconnecting clutch mechanism (not shown). A shaft portion 84b extends from the unit 102, and may be considered to be a continuation of the shaft 84a so far as shaft power transmission is concerned. The housing 102 carries a lever 102a movable between two alternative positions. Movement of the lever 102a between its two alternative positions allows an operator of the vehicle 10 to select on the one hand a power driving relation of the shaft 84a with a shaft portion 84b extending from the selector unit 102; or on the other hand a free turning condition for shaft portion 84b, in which power is not connected from portion 84a to portion 84b.

Further considering the drawing Figures, it is seen that at the end portions 84a (or at portions 84a at one side and 84b on the other side), the shaft 84 is associated in driving relation with an opposite pair of respective universal joints, each indicated with numeral 104. Each universal joint 104 provides connection to a respective one of a pair of oppositely extending drive shafts, each indicated with numeral 106. Likewise, each drive shaft 106 provides power transfer connection to a respective one of a pair of gear units or differentials, one at the front of vehicle 10, and the other at the rear of the vehicle, and each indicated with the numeral 108. From the differentials 108, power is conveyed by respective one of four half-shafts 110 (each having a universal joint 110a) to each of the wheels 28 and 30.

In use of the vehicle 10, the user 12 may employ the sub-transmission 56 to select an appropriate speed range for the vehicle, or may operate the vehicle without reference to such a sub-transmission in case where the vehicle does not employ such a multi-range drive train (i.e., in the cases where shaft 48 connects directly into gear unit 68). In each case, the CVT 44 acts as a centrifugal clutch so that application of throttle above idle speed for the engine 32 causes the driving of power to the wheels 28 and 30 to propel the vehicle 10. As the vehicle 10 accelerates, for example, or as it encounters an incline while moving, the CVT 44 automatically alters the effective speed and torque ratio between the engine 32 and the driven shaft 48 to provide effective propulsion for the vehicle 10. In view of the above, it will be understood that the user selects between forward and backward propulsion of the ATV 10 by selecting the axial position of shift sleeve 90 in the drive unit 68. In the event that the vehicle is provided with selector unit 102, the operator may also choose between operation in two-wheel or four-wheel drive by movement of lever 102a.

Further to the above, it is to be noted that because the shafts 36 (including exterior portion 36a), and 48, as well as the driving and driven pulley assemblies 42 and 48 rotate about a vertical axis, the gyroscopic forces generated by the mass, size, diameter, and rotational speed of these components is effective to resist both roll and pitch of the ATV 10. Thus, even at low ground speeds for the ATV at which the wheel and tire assemblies do not provide an effective gyroscopic effect to assist in vehicle stability, this ATV 10 will receive enhanced stability in pitch and roll because of the speed and gyroscopic effect of the spinning drive train components. As noted above, the pitch and roll axes are the most important from the standpoint of vehicle stability. The gyroscopic effect of these spinning drive train components is not effective to increase stability in the yaw plane (i.e., the rotational plane seen in plan view in which the ATV rotates in response to steering inputs), but this also is an added advantage over conventional ATV's because nimble and responsive steering for such vehicles is desired and a gyroscopic resistance to such steering movements is not desired. That is, the gyroscopic effect of the drive train components spinning about vertical axes does not contribute to stability in yaw, but also does not resist or assist steering inputs to the vehicle 10. Further, because the engine 32 and shaft 48 are disposed along the longitudinal center line 34 of the ATV 10 as is seen in the plan view of FIG. 3, the balance and mass centralization of the vehicle are improved.

What is claimed is:

1. A vehicle with a chassis having plural road wheels upon which said chassis is supported for rolling travel upon a surface, said vehicle comprising:

an engine carried by said chassis and having a vertically-extending crankshaft with an external power output shaft portion extending vertically above said engine;

a drive assembly having a driving first element drivingly carried on the power output shaft portion of the engine, and a driven second element carried on a driven shaft also extending vertically; said drive assembly including a power-transfer third element connecting engine power from said first element to said second element; and additional power train elements drivingly connecting with said driven shaft and transferring engine power to at least one of said plural road wheels to propel said vehicle;

whereby, said first, second, and third elements are disposed at an elevation above said engine in said vehicle providing improved isolation from moisture when said vehicle is operated in water or mud.

2. The vehicle of claim 1 in which said additional power train elements further includes a drive unit of T-configuration, said drive unit having a housing journalling a first gear unit shaft extending vertically and receiving shaft power from said second element, a first bevel gear drivingly carried by said first gear unit shaft, said drive unit also having a second gear unit shaft extending horizontally in said housing and a pair of opposed bevel gears each in constant mesh with said first bevel gear and freely turning relatively to said second gear unit shaft, a shift member drivingly carried on said second gear unit shaft between said pair of bevel gears and movable axially along said second gear unit shaft between a first position adjacent one of said pair of bevel gears and a second position adjacent the other of said pair of bevel gears, means for moving said shift member axially along said second gear unit shaft between said first and second positions, and means for drivingly coupling said one of said pair of bevel gears to said second gear unit shaft, said means for drivingy coupling said one of said pair of bevel gears to said second gear unit shaft being located between said shift member and each of said pair of bevel gears, and said means for drivingly coupling said one of said pair of bevel gears to said second gear unit shaft being responsive to axial movement of said shift member.

3. The vehicle of claim 2 further including a drive shaft drivingly connecting with said second gear unit shaft, said drive shaft conducting shaft power to a road wheel of said vehicle.

4. The vehicle of claim 3 wherein said drive shaft extends from said drive unit toward one of the front and rear of said vehicle, said vehicle further including a second drive shaft drivingly connecting with said second gear unit shaft, said second drive shaft extending toward the other of said front and rear of said vehicle and conducting shaft power to a road wheel of said vehicle which is located adjacent to said other of said front and rear of said vehicle.

5. The vehicle of claim 1 wherein said chassis defines a longitudinal center line in plan view, said engine power output shaft portion being disposed substantially on said longitudinal center line in plan view.

6. The vehicle of claim 5 wherein said second element is carried by a driven shaft extending vertically, said driven shaft and said second element being disposed substantially on said center line in plan view.

7. A method of providing motive power to a vehicle having a chassis supported on plural road wheels, said method comprising steps of:

providing an engine on said chassis having a vertically-extending crankshaft with an external power output shaft portion extending vertically above said engine;

providing a driving first pulley assembly drivingly carried on the power output shaft portion of the engine, and a driven second pulley assembly carried on a driven shaft, arranging said driven shaft to also extend vertically; and a belt connecting engine power from said first pulley assembly to said second pulley assembly; and providing additional power train elements drivingly connecting with said driven shaft and transferring engine power to at least one of said plural road wheels to propel said vehicle.

8. The method of claim 7 further including the steps of providing a drive unit of T-configuration having a housing journalling a first gear unit shaft extending vertically, providing shaft power from said driven shaft to said said drive unit, providing in said drive unit a first bevel gear drivingly carried by said first gear unit shaft, and providing in said drive unit a second gear unit shaft extending horizontally in said housing, and a pair of opposed bevel gears each in constant mesh with said first bevel gear and freely turning relatively to said second gear unit shaft, providing a shift member drivingly carried on said second gear unit shaft between said pair of bevel gears and movable axially along said second gear unit shaft between a first position adjacent one of said pair of bevel gears and a second position adjacent the other of said pair of bevel gears, providing means for moving said shift member axially along said second gear unit shaft between said first and second positions, and providing means for drivingly coupling said one of said pair of bevel gears to said second gear unit shaft, said means for drivingly coupling said one of said pair of bevel gears to said second gear unit shaft being located between said shift member and each of said pair of bevel gears, and said means for drivingly coupling said one of said pair of bevel gears to said second gear unit shaft being responsive to axial movement of said shift member.

9. The method of claim 8 further including the steps of providing a drive shaft drivingly connecting with said second gear unit shaft, and utilizing said drive shaft to conduct shaft power to a road wheel of said vehicle.

10. The method of claim 9 further including the steps of extending said drive shaft from said gear unit toward one of the front and rear of said vehicle, and further providing a second drive shaft drivingly connecting with said second gear unit shaft and said second drive shaft extending toward the other of said front and rear of said vehicle and conducting shaft power to a road wheel of said vehicle which is located adjacent to said other of said front and rear of said vehicle.

11. A modular power train assembly for a vehicle, said modular power train assembly comprising:
    an engine having a vertically-extending crankshaft with an external power output shaft portion extending vertically above said engine;
    a belt-drive transmission disposed above said engine and having a driving pulley assembly drivingly carried on the power output shaft portion of the engine, a driven pulley assembly carried on a driven shaft also extending vertically, a support bearing assembly for said driven shaft securing to said engine, and a flexible belt trained around said driving pulley assembly and around said driven pulley assembly and transferring engine power therebetween.

12. The power train assembly of claim 11 further including a drive unit of T-configuration, said drive unit having a housing journalling a first gear unit shaft extending vertically and receiving shaft power from said driven shaft, a first bevel gear drivingly carried by said first gear unit shaft, said drive unit also having a second gear unit shaft extending horizontally in said housing and a pair of opposed bevel gears each in constant mesh with said first bevel gear and freely turning relatively to said second gear unit shaft, a shift member drivingly carried on said second gear unit shaft between said pair of bevel gears and movable axially along said second gear unit shaft between a first position adjacent one of said pair of bevel gears and a second position adjacent the other of said pair of bevel gears, means for moving said shift member axially along said second gear unit shaft between said first and second positions, and cooperative clutching means defined between said shift member and each of said pair of bevel gears and responsive to axial movement of said shift member adjacent to one of said pair of bevel gears to drivingly couple said one of said pair of bevel gears to said second gear unit shaft.

13. The modular power train assembly of claim 12 further including a gear unit interposed in power transfer relation between said second pulley assembly and said first gear unit shaft.

14. A method of providing motive power to a vehicle having an engine and a chassis supported on plural road wheels, said method comprising steps of:
    orienting an external power output shaft vertically above said engine;
    arranging a driving first pulley assembly on said power output shaft, connecting a belt between said first pulley assembly and a second pulley assembly carried on a driven shaft, orienting said driven shaft in a vertical orientation relative to said engine, said belt connecting engine power from said first pulley assembly to said second pulley assembly; and
    transferring engine power through said driven shaft to at least one of said plural road wheels to propel said vehicle.

15. The method of claim 14 further including the steps of:
    orienting a drive unit of T-configuration adjacent to said driven shaft;
    orienting a first gear unit shaft vertically relative to said gear unit, and drivingly coupling a first end of said first gear unit shaft to said driven shaft, and drivingly coupling a second end of said first gear unit shaft to a first bevel gear;
    orienting a second gear unit shaft horizontally relative to said gear unit, and arranging a pair of opposed bevel gears each in constant mesh with said first bevel gear and freely turning relatively to said second gear unit shaft;
    drivingly coupling a shift member on said second gear unit shaft between said pair of bevel gears, said shift member being axially movable along said second gear unit shaft between a first position adjacent one of said pair of bevel gears and a second position adjacent the other of said pair of bevel gears;
    coupling said shift member to a means for moving said shift member axially along said second gear unit shaft between said first and second positions; and
    locating a means for drivingly coupling said one of said pair of bevel gears to said second gear unit shaft between said shift member and each of said pair of bevel gears, said means for drivingly coupling said one of said pair of bevel gears to said second gear unit shaft being responsive to axial movement of said shift member.

16. The method of claim 15 further including drivingly connecting a drive shaft with said second gear unit shaft, and utilizing said drive shaft to conduct shaft power to a road wheel of said vehicle.

17. The method of claim 16 further including extending said drive shaft from said gear unit toward one of the front and rear of said vehicle, and further providing a second drive shaft drivingly connected with said second gear unit shaft and extending said second drive shaft toward the other of said front and rear of said vehicle and conducting shaft power to a road wheel of said vehicle which is located adjacent to said other of said front and rear of said vehicle.

* * * * *